(12) United States Patent
Yanagawa et al.

(10) Patent No.: US 7,163,565 B2
(45) Date of Patent: Jan. 16, 2007

(54) ELECTRODE PLATE FOR SECONDARY BATTERY, METHOD OF MANUFACTURING THE SAME, AND SECONDARY BATTERY USING THE SAME

(75) Inventors: Toshirou Yanagawa, Sumoto (JP);
Tadatoshi Fukuta, Sumoto (JP);
Hitoshi Tanaka, Mihara-gun (JP);
Yoshinobu Okumura, Sumoto (JP);
Ryuji Ohshita, Tokushima (JP);
Yoshikumi Miyamoto, Kyoto (JP); Jun Okazaki, Itano-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 366 days.

(21) Appl. No.: 10/768,192

(22) Filed: Feb. 2, 2004

(65) Prior Publication Data
US 2004/0191634 A1    Sep. 30, 2004

(30) Foreign Application Priority Data
Feb. 4, 2003    (JP)    ............... 2003-027018

(51) Int. Cl.
*H01M 6/00*    (2006.01)
*H01M 2/16*    (2006.01)
(52) U.S. Cl. .............. 29/623.3; 29/623.5; 429/246
(58) Field of Classification Search ........... 429/246, 429/243, 94; 29/623.3, 623, 623.5, 623.4
See application file for complete search history.

(56) References Cited

U.S. PATENT DOCUMENTS 5,631,102 A * 5/1997 Spillman et al. ............... 429/94
2003/0224242 A1* 12/2003 Kaito et al. .................... 429/94

FOREIGN PATENT DOCUMENTS

| JP | 10-241737 | 9/1998 |
|----|-----------|--------|
| JP | 2000-030742 | 1/2000 |
| JP | 2002-042881 | 2/2002 |

* cited by examiner

*Primary Examiner*—Patrick Joseph Ryan
*Assistant Examiner*—Thomas H. Parsons
(74) *Attorney, Agent, or Firm*—Nixon & Vanderhye P.C.

(57) ABSTRACT

An electrode plate for a secondary battery is provided for reducing adverse influences caused by paste of an insulating sheet in an electrode body and a battery specification. Active material layers 22a to 22d and 22a' to 22d' are formed on at least one surface of an electrode sheet 20 over a wider range than a predetermined width of an electrode and over a predetermined length. An insulating sheet 13a is made to adhere to a possible short-circuit portion of the electrode sheet 20 which portion is opposed to another electrode. The electrode sheet 20 and an insulating member are simultaneously cut to form an electrode plate having a predetermined shape, wherein the insulating member has a low-temperature thermoplastic paste material applied on one side thereof, and is made to adhere to the electrode sheet 20 through heat adhesion.

14 Claims, 5 Drawing Sheets

ELECTRODE PLATE FOR SECONDARY BATTERY, METHOD OF MANUFACTURING THE SAME, AND SECONDARY BATTERY USING THE SAME

BACKGROUND OF THE INVENTION

1. Field of the Invention

The present invention relates to an electrode plate suitable for a nonaqueous electrolyte secondary battery, e.g., a lithium secondary battery or the like, a method of manufacturing the same, and a secondary battery using the same. More specifically, the invention relates to (1) an electrode plate with an insulating jointed to the plate effectively and accurately in a predetermined position to prevent short circuits, (2) a method of manufacturing the same, and the like.

2. Description of the Background Art

Because of the rapid growth and development of portable electronic devices, the specification requirements for a battery used for such products have become more and more exacting. In particular, a compact low-profile battery with a high capacity, excellent cycle character, and stable performance is absolutely desirable. In the field of secondary batteries, lithium secondary batteries have generated more interest than other batteries because of their high energy density, and as a result their market share continues to grow.

Such a lithium secondary battery comprises a negative electrode having a strip-shaped negative electrode collector made of copper foil or the like and a negative electrode active material coating applied on each side of the negative collector, a positive electrode having a strip-shaped positive electrode collector made of aluminum foil or the like and a positive electrode active material coating applied on each side of the positive collector, and a separator made of fine porous polypropylene film or the like, the negative and positive electrodes being coiled together via the separator in cylindrical or elliptic cylindrical form, with the separator providing electrical insulation between the negative and positive electrodes. In the case of a square battery, such a coiled electrode body is pressed or compressed into a flat shape, and a negative lead is welded to a predetermined part of the negative electrode, while a positive lead is welded to a predetermined position of the positive electrode, both of these electrodes being accommodated in a casing having a predetermined shape.

The above-mentioned flat shaped coiled electrode body is normally produced in the following manner.

First, a strip-shaped negative electrode collector is intermittently coated on both sides thereof with a negative electrode active material mixture in its longitudinal direction, and then the collector is processed to form a negative electrode member of predetermined thickness and width having a number of negative electrodes arranged in sequence. Likewise, a strip-shaped positive electrode collector is intermittently coated on both sides thereof with a positive electrode active material mixture in a longitudinal direction, and then the collector is processed to form a positive electrode member of predetermined thickness and width having a number of positive electrodes arranged in series. The negative and positive electrode members so obtained are then fed to a predetermined coiling position, together with the two separators interposed between the electrode members, in a coiled state.

In the coiling position, the negative electrode member, a first separator, the positive electrode member, and a second separator are disposed layer by layer in that order and coiled around a cylindrical or elliptic cylindrical core which resides on the inner side of the negative electrode member. Thereafter, a negative electrode part wound around the core is cut from the negative electrode member, while a positive electrode part wound around the core is cut from the positive electrode member, and parts of the first and second separators used for the single flat coiled electrode body around the core having a length similar to that of the electrode body are cut from the respective separators. Coiling processing is performed to manufacture a number of coiled electrode bodies in turn, each having a substantially cylindrical or elliptic cylindrical shape. It is noted that the negative and positive leads are welded or molded to non-coated parts of the negative and positive members.

The square battery is manufactured through the use of a predetermined press machine which is designed to clamp and press the cylindrical or elliptic cylindrical electrode body in a radial direction to form a flat electrode body.

However, in the formation of such an electrode body, since the negative and positive electrodes coiled around the core are cut out from the respective negative and positive electrode members, the cut edges of the negative and positive electrodes, that is, the cut edges of the negative and positive electrode collectors made of metal form burs. Moreover, in the process, peeling off of the active material and wearing away of the manufacturing device cause conductive particles on the non-coated parts of the active materials to remain on the positive and negative electrodes.

When the elliptic cylindrical electrode body is pressed to form a flat electrode body, the remaining burs or particles produced cause the adjacent separator to break away, thereby establishing electrical continuity between positive and negative electrodes via these burs, causing a short circuit. This short circuit generates extraordinary heat during use of the battery, lowering the capacity thereof, thereby shortening its service life.

Figure 4:
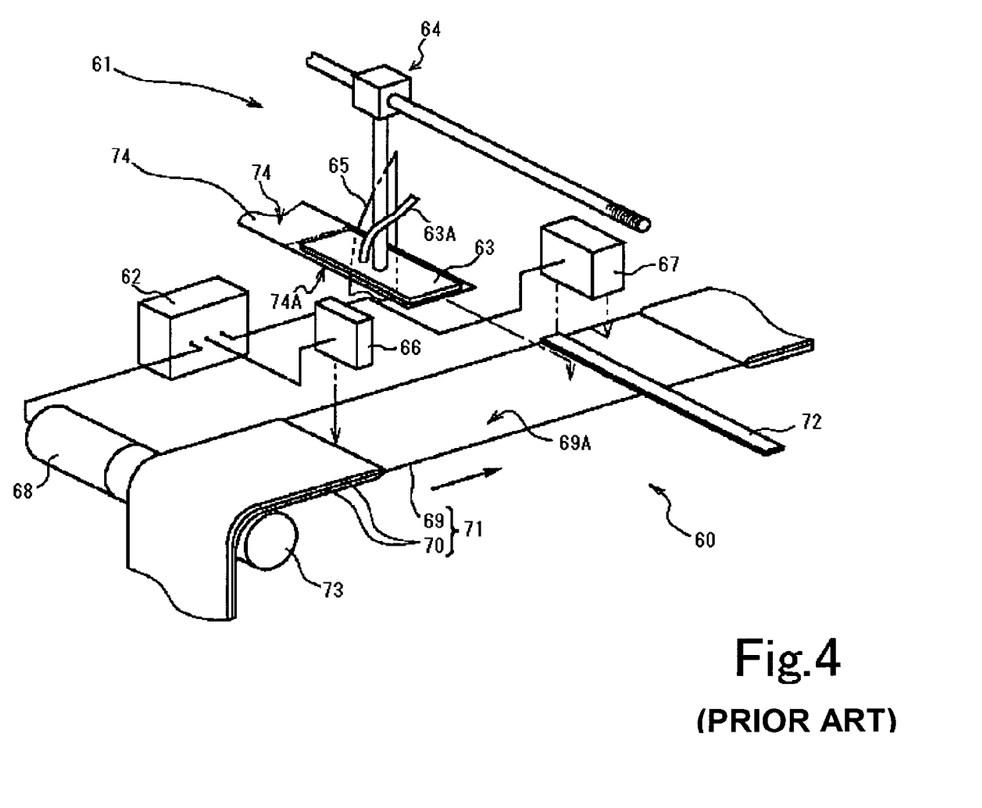
FIG. 4 is a perspective view of a tape sticking device in the prior art.
Figure 5:
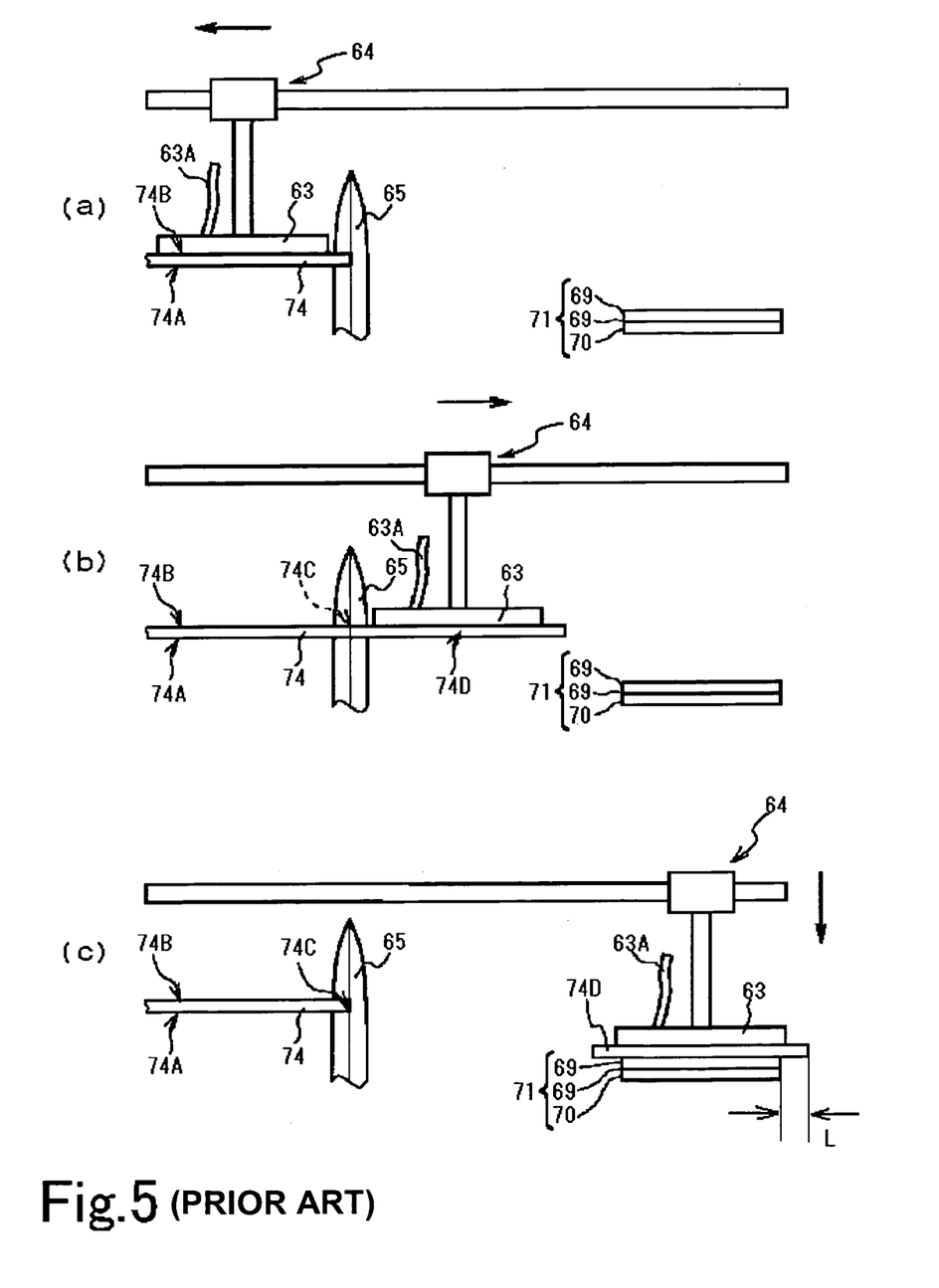
FIG. 5 shows side views, each explaining the process of adhesion of an insulating tape to a negative electrode member, using the tape sticking device of FIG. 4.

To eliminate glitches caused by the burs, a method has been proposed whereby electrode leads are to reside at the center of the coiled electrodes and at the outermost portion thereof, such that electrodes of opposite polarity will not face connecting portions of the electrode leads, or to apply an insulating coating to a portion of at least one positive electrode, a separator and one negative electrode, which portion is opposed to a positive lead. The method of using the insulating coating is most frequently carried out in particular, as disclosed in many patents, for example, in Japanese Unexamined Patent Publication No. 2002-42881 (see page 3, right column to page 4, left column, and FIGS. 1, 2 and 8), and in Japanese Unexamined Patent Publication No. 10-241737(see page 3 to page 4, and FIG. 1). The former patent discloses a tape sticking device used to adhere insulating tape to a portion of at least one positive and one negative electrode and separator, which portion is opposed to the positive lead. FIG. 4 is a perspective view of this tape sticking device. FIG. 5 is a side view explaining the process of securing the insulating tape to a negative electrode member, using the tape sticking device of FIG. 4.

A tape sticking device 60 includes an upper tape sticking mechanism 61, and a controller 62 for controlling this tape sticking mechanism. It should be noted that a lower tape sticking mechanism and another controller for controlling the mechanism are provided opposed to the upper tape sticking mechanism 61 beneath a negative electrode member 71, but they are not shown in FIG. 4.

The upper tape sticking mechanism 61 includes a head 63 for sucking a strip-shaped insulating tape 74, a moving means 64 for moving the sucking head 63 in a predetermined direction, and a cutter 65 for cutting the strip-shaped insulating tape 74. Head 63 is connected via line 63A to a vacuum supply (not shown). The controller 62 is driven to control the whole of the upper tape sticking mechanism 61 based on signals from an active-material detecting sensor 66 and a side-edge detecting sensor 67, and on signals from a rotary encoder 68, thereby causing the insulating 74 cut out to stick to a predetermined position.

In the tape sticking device 60, a negative electrode collector 69 is intermittently coated on both sides with an active material for negative electrode 70, and negative leads 72 are welded in sequence to non-coated areas 69A. This collector is lead by a guide roller 73. In this state, the strip-shaped insulating tape 74 is sucked by the sucking head 63 by back pressure generated in a vacuum duct 63A and transferred onto the negative electrode member 71. And, as shown in FIG. 5(a), with a tip of strip-shaped insulating tape 74 substantially aligned with the moving edge path of the cutter 65, the sucking head 63 is moved to a sticking position by the moving means 64 to abut against an upper surface 74B of the tip of the strip-shaped insulating tape 74.

Thereafter, as shown in FIG. 5(b), the sucking head 63 is moved to a cutting position on one side of the negative electrode member 71 side, causing a cutting position of interest 74C of the strip-shaped insulating tape 74 to substantially align with the moving edge path of the cutter 65. Then the cutter 65 is moved to cut out a strip whose tip is on a sticking position of interest 74D, from the strip-shaped insulating tape 74.

Finally, as shown in FIG. 5(c), the sucking head 63 is moved to above the negative electrode member 71, causing the lower surface 74A of the strip-shaped insulating tape 74D to be opposed to the upper surface of the negative electrode member 71. Subsequently, the sucking head 63 is moved downward, causing the lower surface 74A of the strip-shaped insulating tape 74D, on which an adhesive is applied, to abut against the upper surface of the negative electrode member 71. Then, negative pressure applied to the sucking head 63 is released, so that the strip-shaped insulating tape 74D adheres to the upper surface of the negative electrode member 71.

The tape sticking device 60 is also applicable to a positive electrode member. The positive electrode member has the strip-shaped insulating tape adhering to various kinds of possible short-circuit portions of the positive electrode with respect to its upper and lower sides, including a boundary place between the positive electrode collector and the area coated with a positive electrode active material, a welding place of a positive lead, or the like, for example. Adhesion of the insulating tape to the electrode as described above also effectively helps prevent the occurrence of short circuits due to the presence of conductive particles.

The tape sticking device 60 can cause the insulating tape to adhere in advance to a possible short-circuit portion where a short-circuit may occur between the negative and positive electrodes due to burs on the cut edges of the negative and positive electrode collectors, i.e., on the cut edges of the negative and positive electrodes, when forming the flat electrode body.

However, the insulating tape sticks to the possible short-circuit part such that its longitudinal length is slightly longer than the width of one of the negative and positive electrodes depending on the height of the burs, with one end of the tape in the longitudinal direction protruding outward from one side edge of the electrode, and with the other end thereof in the longitudinal direction protruding outward from the other side edge of the electrode. That is, as shown in FIG. 5(c), the strip-shaped insulating tape 74D has its right and left ends protruding from the negative electrode member 71 by a length L, respectively. Further, it is actually difficult if not impossible to fix or secure the insulating tape having the same dimension as the electrode so as not to protrude from the side edges of the electrode.

For that part of the insulating tape which protrudes from the electrode body, paste material included in the protruding part will adhere or stick to a press machine in the post-process to be carried out by a manufacturing device, e.g., when compressing the electrode body with the insulating tape adhering thereto. This often necessitates cumbersome handling, such as cleaning of the press machine or the like, leading to reduced production efficiency.

When an electrode body is inserted in an exterior can, the paste material of the insulating tape often adheres to the can, making it difficult to insert the electrode body further. Moreover, conventionally, before the coiling process is carried out to make the electrode body after the electrodes are processed to set their width to a predetermined size, an insulating tape must be applied to each electrode plate. This unfortunately results in extremely low efficiency in the production of the electrode body.

SUMMARY OF THE INVENTION

The present invention is intended to address the foregoing problems encountered in the known art, and it is the first object of the present invention to provide an electrode plate for a secondary battery that can diminish the adverse influence caused by the paste material of the insulating sheet in an electrode body manufacturing apparatus and a battery specification.

The second object of the present invention is to provide a method of manufacturing an electrode plate manufacturing apparatus for a secondary battery by which adhesion of the paste material to the electrode plate at room temperature is inhibited, such that a plurality of electrode plates can be processed at the same time, resulting in increased production efficiency.

The third object of the present invention is to provide a highly reliable secondary battery in which a satisfactorily high manufacturing yield is achieved and short-circuits are eliminated by using the electrode plate manufactured through the above-mentioned manufacturing method.

The above-mentioned objects may be accomplished in the following manner.

According to the present invention, a secondary battery comprises an electrode sheet with an active material layer residing on at least one surface thereof over a wider range than a predetermined width of an electrode and over a predetermined length, and an insulating member adhering to a possible short-circuit part of the electrode sheet, such part being opposed to another electrode, characterized in that the electrode sheet and the insulating member are simultaneously cut to form the electrode plate having a predetermined shape. Preferably, the insulating member has a low-temperature thermoplastic paste material applied on its side, and is attached to the electrode sheet through heat adhesion.

Under this arrangement, the insulating sheet can be securely made to adhere to a part of the electrode plate and thereby establish an inner short circuit such that it does not protrude from the electrode plate in the longitudinal width direction. Therefore, since the insulating sheet does not protrude from the outline of the electrode plate, the paste material of the insulating sheet is prevented from adhering or sticking to the press machine or the like during the manufacturing process. The use of low-temperature thermoplastic paste as paste material can inhibit adhesion of the paste at room temperature, and prevent the paste from adhering to the electrode body manufacturing apparatus.

A method of manufacturing an electrode plate for a secondary battery according to the present invention comprises the following steps. First, at least one surface of an electrode sheet is intermittently coated with an active material at predetermined intervals over a wider range than a predetermined width of an electrode plate and over a predetermined length, then die-cutting an insulating sheet with paste material adhered to one side thereof into insulating sheets, each of which has a width wider than a predetermined width of the electrode plate, thereafter sticking the insulating sheet to a possible short-circuit part of the electrode sheet in turn, such part being opposed to another electrode, and simultaneously cutting the electrode sheet and the insulating sheet to form an electrode plate having a predetermined shape.

Preferably, a low-temperature thermoplastic paste material is applied on one side of the insulating sheet and the latter is attached to the electrode sheet through heat adhesion.

Under this method, after the insulating sheets are adhered to the electrode sheet, an electrode body of a predetermined shape is formed and obtained, thus preventing the insulating sheets from coming off the electrode or electrode plate. As mentioned above, the electrode sheet is coated with active materials to produce a plurality of electrode bodies, and these active materials are subjected to predetermined processing to form the active material layers to which the insulating sheets are made to adhere, and then the electrode plates are cut to a predetermined shape. Therefore, a plurality of electrode plates can be processed and formed at the same time, leading to increased productivity. Since the paste material of the insulating sheets are heated and melted to adhere to the electrode sheet, adhesion of the paste effected at room temperature is suppressed, enabling inhibition of adhesion of the paste to the device in the post-process.

A secondary battery of the present invention is characterized by using an electrode body produced in the above-mentioned manner.

The use of this electrode plate can provide a highly reliable secondary battery with reduced short circuits and improved manufacturing yield.

BRIEF DESCRIPTION OF THE DRAWINGS

FIG. 1(a) is a detailed diagram showing the relationship between an insulating sheet and an electrode sheet as well as the insulating sheet, and FIG. 1(b) is a side view of the electrode sheet.

FIG. 2(a) is a detailed plane view thereof, and FIG. 2(b) is a side view thereof

DESCRIPTION OF THE PREFERRED EMBODIMENTS

Figure 1:
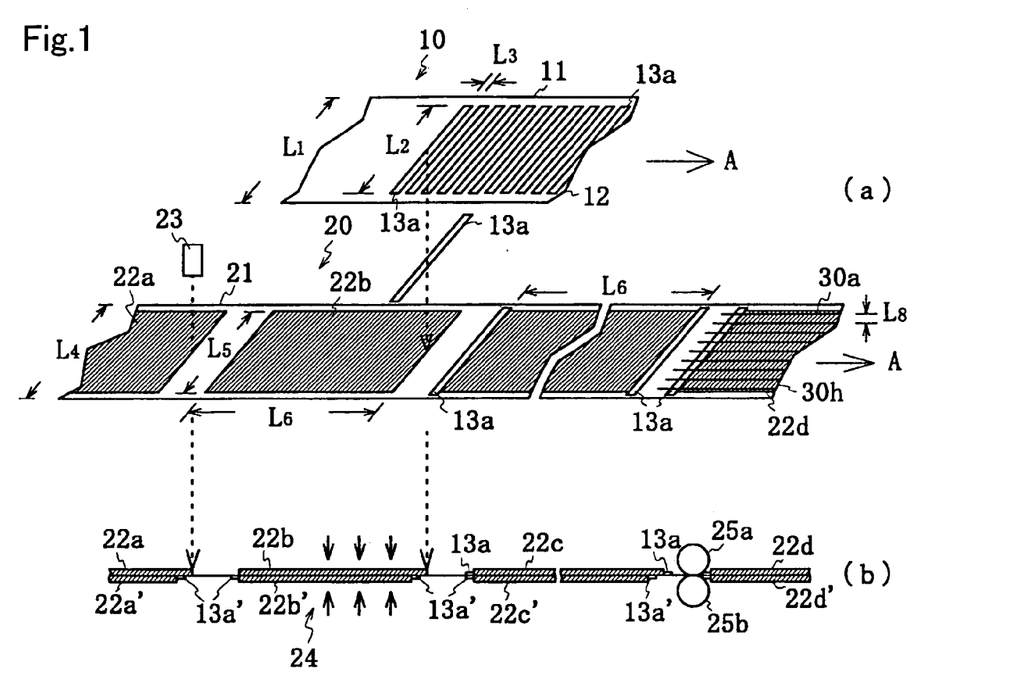
FIG. 1 is a schematic diagram explaining the method of manufacturing an electrode plate for a secondary battery according to one preferred embodiment of the present invention.
Figure 2:
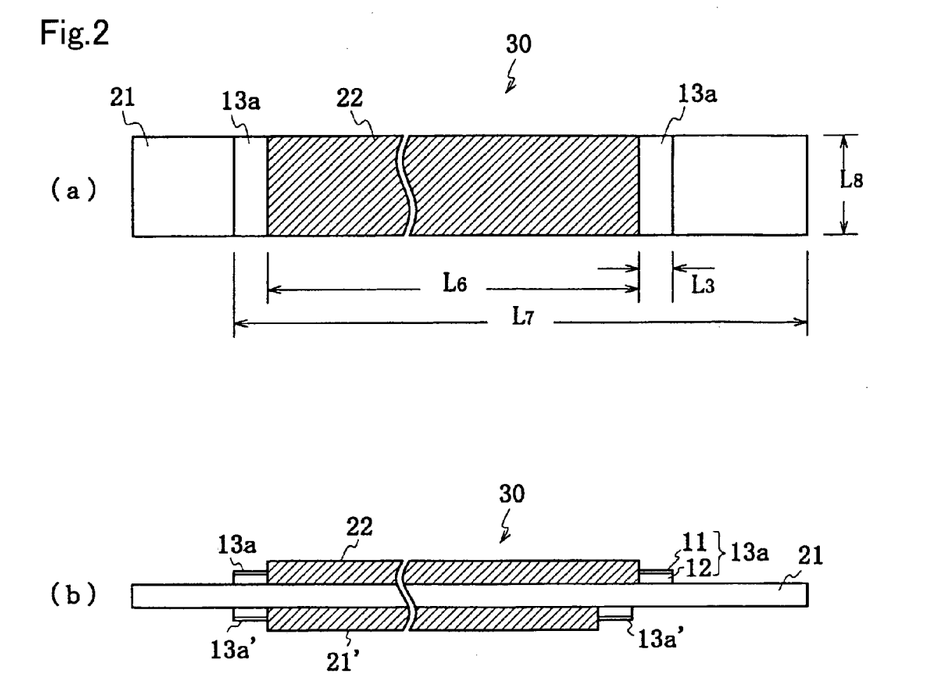
FIG. 2 is a diagram of the electrode plate according to one preferred embodiment.

The electrode plate according to the invention and the method of manufacturing the same is hereafter described with reference to the accompanying drawings. FIG. 1 is a schematic diagram explaining the method of sticking an insulating sheet. FIG. 1(a) is a detailed diagram showing the relationship between the insulating sheet and an electrode sheet as well as the insulating sheet, and FIG. 1(b) is a side view of the electrode sheet. FIG. 2 shows one piece of the electrode plate manufactured by the manufacturing method of FIG. 1. FIG. 2(a) is a detailed plane view thereof, and FIG. 2(b) is a side view thereof.

An insulating sheet 10 as well as an electrode sheet 20 both having a predetermined shape are prepared in advance. The insulating sheet 10 includes a sheet material 11 having a predetermined width and thickness, and a paste layer 12 attached on the back surface of the sheet material 11. The sheet material 11 is formed by using a sheet of paper or resin material including polyolefin such as polyethylene, polypropylene or the like, polyester such as polyvinyl chloride, polyethylene terephthalate, or the like, polyimide, polyamide, polyphenylene sulfide, and so on. The longitudinal width $L_1$ of the sheet material 11 is longer than a predetermined width $L_8$ of one sheet of electrode or electrode plate. For a plurality of sheets n of electrodes or electrode plates, the width $L_1$ of the sheet material 11 is slightly longer than a length of $L_8 \times n$ (n>1). The thickness of the sheet material 11 is within the range of 10 to 200 μm, preferably 20 to 100 μm, and preferably greater than that of a bur.

Although the paste layer 12 may be made of arbitrary paste materials, it must have as little adhesion as possible at room temperature, but some increased adhesion at a temperature of 60 to 120° C., preferably 70 to 100° C. For example, the paste preferably consists of ethylene-vinyl acetate copolymer (EVA), ethylene-ethyl-acrylate (EEA), ethylene methacrylic acid (EMAA).

Figure 3:
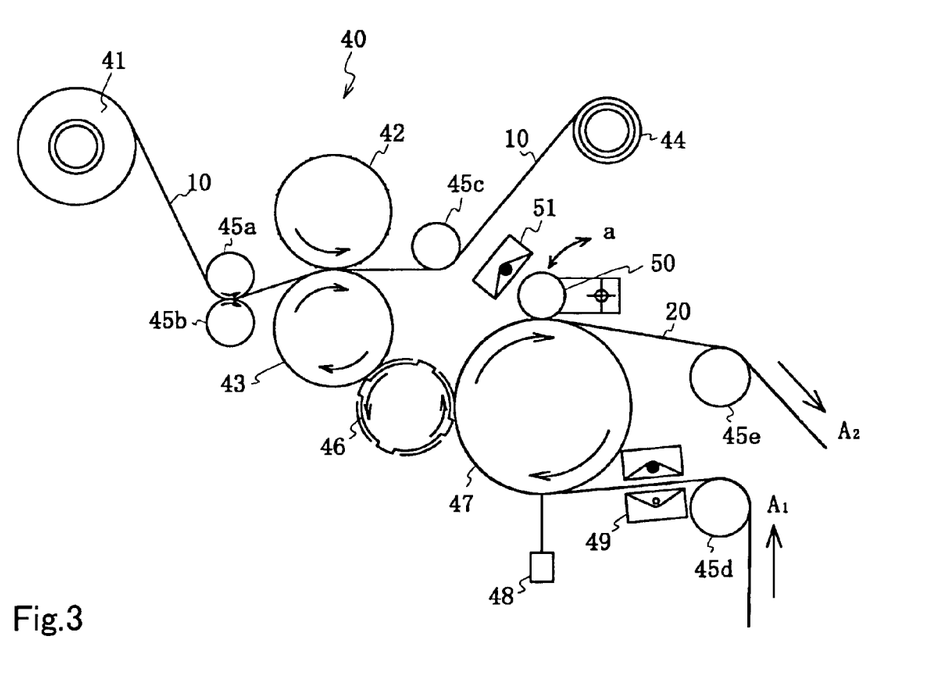
FIG. 3 is a schematic diagram of the insulating tape sticking device used in the manufacturing method of FIG. 1.

The insulating sheet 10 is stamped or die-cut into insulating sheets 13a in sequence, each having given longitudinal and lateral widths $L_2$ and $L_3$, using a proper die-cutting machine (see FIG. 3). In the relationship between the aforesaid $L_8 \times n$ and $L_1$, the longitudinal length $L_2$ may be set to satisfy the formula $L_8 \times n < L_2 \leq L_1$. The lateral width $L_3$ may be arbitrarily set to a narrow size.

The insulating sheet 10 may be used for both positive and negative electrode bodies. Normally, the width of the electrode plate for the positive electrode is slightly narrower than that of the negative electrode plate. In particular, if the width of the positive electrode plate is set to 56 mm, then the width of the negative electrode plate is set to be longer than that of the positive plate, e.g., 57.5 mm. Thus, the width of the insulating sheet 10 for the negative electrode is intended to be slightly wider than that of the sheet for the positive electrode.

The electrode sheet 20 includes a sheet material 21 having a predetermined width and thickness, and active material layers 22a to 22d intermittently applied to the sheet material 21 on both the upper and lower sides thereof at predetermined intervals in its longitudinal direction over a predetermined width. Each active material layer 22a to 22d is formed by subjecting the applied active material layer 22a to predetermined processing in turn. The electrode sheet 20 may be used to manufacture both the positive and negative electrode plates. The electrode sheet 20 for the positive electrode has the following structure.

The sheet material 21 for the positive electrode is comprised of aluminum, stainless steel, nickel, titanium, or an alloy of these metals, most preferably, aluminum. The longitudinal width $L_4$ of the sheet material 21 is longer than a predetermined width $L_8$ of one electrode sheet or electrode plate. For a plurality of sheets n of electrodes or electrode plates, the width $L_4$ of the sheet material 21 is slightly longer than the length of $L_8 \times n$ (n>1). The longitudinal length of the sheet material 21 may be arbitrarily set, while its thickness shall be within the range of 10 to 100 μm, preferably 10 to 30 μm.

The sheet material 21 is coated on both its upper and lower sides with an active material for the positive electrode, wherein the active material applied refers to a positive electrode mixture containing a positive electrode active material. Such positive electrode active material may be a lithium oxide compound such as a lithium cobalt oxide compound or the like. The upper positive electrode active material layers 22a to 22d are opposed to the lower positive electrode active material layers 22a' to 22d'. As shown in FIG. 1(b), the length between the ends of each of the lower active material layers 22a' to 22d' is slightly shorter than that between the ends of each of the upper layers 22a to 22d in a longitudinal direction.

Each of the active material layers 22a to 22d and 22a' to 22d' has a predetermined longitudinal width $L_5$ and a predetermined lateral width $L_6$. The longitudinal width $L_5$ of the active material layer is longer than a predetermined width $L_8$ of one electrode sheet or electrode plate. For a plurality of sheets n of electrodes or electrode plates, the width $L_5$ of the active material layer is slightly longer than a length of $L_8 \times n$ (n>1). The lateral width $L_6$ of the active material layer is set to the same length as the predetermined lateral width $L_6$ of the electrode plate. The active material layer is formed by applying the active material on the sheet material to a thickness of 30 to 100 μm, preferably 40 to 80 μm.

Now, a method of manufacturing an electrode body for the positive electrode, using the insulating sheet 10 and the electrode sheet for the positive electrode 20 as mentioned above, will be described below.

The insulating sheet 10 and the positive electrode sheet 20 are fed at respective predetermined speeds in the direction of arrow A.

First, the sheet material 21, with the active electrode active material applied on the upper and lower sides thereof within the predetermined range, is moved in the direction of arrow A. Then, the boundary of a coated area with the positive electrode active material layer 22a on the upper side of the sheet material 21 is detected by a position detecting sensor 23. A signal from the position detecting sensor 23 is then transmitted to a die-cutting machine (see FIG. 3). Thereafter, the applied positive electrode active layer 22a and the electrode sheet 20 are heated up to the level of the melt temperature of the paste of the insulating sheet 13a by a proper heater (see FIG. 3).

Meanwhile, the die-cutting machine receives the signal from the position detecting sensor 23 to die-cut the insulating sheet into insulating sheets 13a of a prescribed shape. The sheet pieces 13a are made to adhere to or reside within the vicinity of the side edges of the tip end and the rear end of the positive electrode active material layer 22b on the sheet material 21. The positive electrode active material layer 22c with the insulating sheet 13a stuck thereto is then fed to the next stage of the manufacturing process. Thereafter, the positive electrode sheet 20 is cut at predetermined electrode widths $L_8$ in its longitudinal direction by cutting devices 25a and 25b, to form a plurality of pieces or sheets of electrode bodies 30a to 30h.

The method of forming the positive electrode active material layers on the upper side of the electrode sheet 20 is described in the above explanation. On the lower side of the sheet, the same or similar material may be applied and the same or similar devices can be disposed. That is, there are provided, on the lower side, an insulating sheet 10 and a position detecting sensor, which are the same as those provided on the upper side, respectively. Further, the positive electrode active material layers 22a' to 22d' on the lower side are subjected to the same processing. The explanation therefor has thus been omitted.

FIG. 2 shows one electrode plate 30 as a representative of a plurality of electrode plates 30a to 30h cut and manufactured using the above-mentioned method. As shown in FIG. 2, after the insulating sheets 13a are made to adhere to or reside within the vicinity of the side edges of the tip end and the rear end of the positive electrode active material layer 22b on the sheet material 21, the electrode sheet 20 is cut at predetermined electrode widths $L_8$ in its longitudinal direction to form the positive electrode plates 30. Thus, the electrode plates for positive electrodes are formed such that the insulating sheets 13a do not come off the sheet material 21 in the direction of the longitudinal width.

The negative electrode plate is manufactured in the same manner as the positive electrode plate. The explanation of duplicate points concerning manufacturing process thereof will be omitted below, and only the different points in the process between the opposite electrode plates will be hereinafter explained. Normally, the width of the negative electrode plate is slightly longer than that of the positive electrode plate. Thus, in manufacturing the negative electrode plate, an electrode sheet 20 for the negative plate which is slightly wider than the sheet 20 for the positive plate should be used.

A sheet material 21 for the negative electrode may be comprised of copper, stainless steel, nickel, titanium, or an alloy of these metals, most preferably, copper. The thickness of the sheet material 21 is within the range of 5 to 100 μm, preferably 5 to 30 μm.

The active material applied onto the negative electrode sheet material 21 refers to a negative electrode mixture containing a negative electrode active material. This negative electrode active material is a carbon material such as graphite, coke, or the like. Alternatively, the active material may be a substance capable of doping and dedoping lithium ions, including a metal oxide or alloy. The active material is applied to a thickness of 30 to 100 μm, preferably 40 to 80 μm.

According to this method, after the insulating sheets 13a adhere to the electrode sheet 20, an electrode body of a predetermined shape is formed and obtained, thus preventing the insulating sheets 13a from coming off the electrode or electrode plate. As mentioned above, the electrode sheet 20 is coated with active materials for a plurality of electrode bodies, and these active materials are subjected to predetermined processing to form the active material layers. After the insulating sheets 13a adhere to the layers, the sheet is cut into electrode bodies, each having a predetermined shape. Therefore, a plurality of electrode bodies can be formed and processed at the same time, thereby permitting increased productivity.

FIG. 3 is a schematic diagram showing a sticking device of the insulating sheet.

A sticking device 40 comprises die-cutting mechanisms 42 and 43 for die-cutting the insulating sheet 10 into the insulating sheets 13a having a width longer than the predetermined width of the electrode, a sticking roll 46 for transferring the insulating sheet 13a cut out, and sheet-sticking mechanisms 47 and 50 for causing the transferred insulating sheets 13a to adhere in turn to possible short-circuit portions of the electrode sheet 20 opposite to another electrode plate. The die-cutting mechanism includes a die cylinder 42 and an anvil cylinder 43. The sheet-sticking mechanism includes a heat roll 47 and a pressure roll 50.

In the sticking device 40, a raw material roll 41 with the insulating sheet 10 wound is installed in advance. The insulating sheet 10 wound around the raw material roll 41 is fed to a rotary die unit comprising the die cylinder 42 and the anvil cylinder 43, so that the insulating sheet 10 is die-cut into insulating sheets 13a. The insulating sheet 13a cut out is then united with the sticking roll 46 made from silicon rubber by absorption, and the remaining insulating sheet 10 is rewound around a waste reel roll 44. Reference characters 45a to 45c are guide rolls for guiding the insulating sheet 10.

On the other hand, the electrode sheet 20 is provided in advance by intermittently applying an active material at predetermined intervals on its upper and lower sides alternately by an active-material coating mechanism (not shown). This electrode sheet 20 is guided by the guide roll 45 in the direction of arrow $A_1$, to be fed via the heat roll 47 in the direction of arrow $A_2$. During this running route, the electrode sheet 20 is preliminarily heated by a far-infrared lamp 49 after passing the guide roll 45. Then, the sheet is further heated by the heat roll 47 to a melt temperature of the paste 12 of the insulating sheet 13a, for example, 120° C.

On this running route, the adhering position of the insulating sheet 13a of the electrode sheet 20 is detected by a sensor 48. Based on this detected signal, the sticking roll 46 sucking the adhering insulating sheet 13a begins to rotate at the time of modifying the sticking position and continues to rotate in synchronism with the rotation of the electrode sheet 20. Consequently, the insulating sheets 13a are adhered or stick to predetermined portions of the electrode sheet. At this time, the adhering portion of the insulating sheet 13a is pressed against the pressure roll 50 made of silicon rubber, which is heated to a temperature more than the melt temperature of the paste 12 of the insulating sheet 13a by a heating means 51, to be securely fixed to the electrode sheet 20 through heat-adhesion.

The electrode sheet 20 with the insulating sheets 13a adhering thereto through the sticking device 40 is thereafter cut together with the sheet pieces 13a by proper cutting devices 25a and 25b (see FIG. 1) to form the electrode plate having the predetermined shape.

According to this device, after the insulating sheets 13a adhere to the electrode sheet 20, an electrode body of a predetermined shape is formed and obtained, thus preventing the insulating sheets 13a from coming off the electrode or electrode plate. As mentioned above, the electrode sheet 20 is coated with active materials for a plurality of electrode plates, and these active materials are subjected to predetermined processing to form the active material layers. After the insulating sheets 13a adhere to the layers, the electrode plates, each having a predetermined shape, are cut out. Therefore, a plurality of electrode plates can be formed and processed at the same time, thereby permitting increased productivity.

Since the paste of the insulating sheets 13a is heated and melted to be applied to the electrode sheet, adhesion of the paste effected at room temperature is suppressed, enabling inhibition of the adhesion of the paste to the device in the post-process.

The insulating sheet sticking device 40 may pull and cut out an insulating sheet of a given length from a narrow roll which has been slit into the width of the insulating sheet 13a intended for adhesion, to supply it to the sticking roll, instead of the die unit cutting out the insulating sheet from the raw material roll whose width is the same as that of the electrode sheet 20. This method can lessen the amount of waste produced.

Further, the insulating sheet sticking device 40 may preliminarily heat the sheet by a heating apparatus such as an infrared lamp, hot air, or the like, instead of using far-infrared lamp 49 of the sticking device 40.

The electrode plates for negative and positive electrodes may thus be manufactured using the above explained manufacturing method and device, and the plates thus obtained may be used to produce a secondary battery. This manufacturing method employs a known method. For example, a given separator is provided to intervene between electrode plates for negative and positive electrodes, with electrical insulation provided between the negative and positive electrode plates, and then they are wound into a round or elliptical shape. Thereafter, this wound electrode plate is pressed into a flat shape to form a flat electrode body. The negative and positive leads provided on the negative and positive electrode plates are welded to an exterior can or a sealing plate of a predetermined shape. These are accommodated in the exterior can together with predetermined electrolyte solution. The use of this electrode plate provides a highly reliable secondary battery with reduced short circuits and improved manufacturing yield.

In the electrode plate of the present invention, the insulating sheet does not come off or protrude from an outline of the electrode plate, thereby preventing the paste of the insulating sheet from adhering to the press machine or the like during the manufacturing process. The use of low-temperature thermoplastic paste as paste material can inhibit adhesion of the paste at room temperature, and prevent adhesion of the paste to the electrode body manufacturing apparatus or a battery assembly apparatus.

In the manufacturing method of the present invention, after the insulating sheet is stuck to the electrode sheet, the electrode body of a predetermined shape is formed and obtained, thereby preventing the insulating sheet from coming off the electrode or electrode plate. The electrode sheet is coated with active materials for a plurality of electrode plates, and these active materials are subjected to predetermined processing to form the active material layers, to which the insulating sheets are bonded, and then the electrode plates, each having a predetermined shape, are cut out. Therefore, a plurality of electrode plates can be formed and processed at the same time, allowing for increased productivity. Moreover, since the paste of the insulating sheets is heated and melted to adhere to the electrode sheet, adhesion of the paste effected at room temperature is suppressed, enabling inhibition of the adhesion of the paste to the device in the post-process.

In addition, according to the present invention, a highly reliable secondary battery with reduced short circuits and improved manufacturing yield is achieved.

What is claimed is:

1. A method of manufacturing an electrode plate for a secondary battery, such method comprising the steps of:
   intermittently coating at least one surface of an electrode sheet with an active material at predetermined intervals over a wider range than a predetermined width of an electrode plate and over a predetermined length;

die-cutting an insulating sheet with a paste material adhering onto one side thereof into insulating sheets, each of which has a width wider than a predetermined width of an electrode plate;

sticking said insulating sheet to a possible short-circuit portion of said electrode sheet in turn, such portion being opposed to another electrode plate; and simultaneously cutting said electrode sheet and said insulating sheet to form an electrode plate having a predetermined shape.

2. The method according to claim 1, wherein said paste material is a low-temperature thermoplastic one, and said insulating sheet is made to adhere to said electrode sheet through heat adhesion of the said paste.

3. An electrode plate for a secondary battery, comprising:
an electrode sheet with an active material layer formed on at least one surface thereof over a wider range than a predetermined width of an electrode plate and over a predetermined length; and an insulating sheet, adhering to a portion of said electrode sheet where a short-circuit may possibly occur, wherein said electrode sheet is wider in width than the active material layer, said portion being opposed to another electrode and said portion is at least one position selected from a front edge and a rear edge of the active material layer of the electrode plate, wherein said electrode sheet and said insulating sheet are simultaneously cut in a longitudinal direction to form the electrode plate having a predetermined shape of which a width of the electrode plate, a width of the active material layer on the electrode plate and a length of the insulating sheet are substantially the same.

4. An electrode plate for a secondary battery, comprising:
an electrode sheet with an active material layer formed on at least one surface thereof over a wider range than a predetermined width of an electrode plate and over a predetermined length; and an insulating sheet adhered with a thermoplastic paste material that increases adhesion at a temperature of 60 to 120 degree Celsius, adhering to a portion of said electrode sheet where a short-circuit may possibly occur, wherein said electrode sheet is wider in width than the active material layer, such portion being opposed to another electrode, wherein said electrode sheet and said insulating sheet are simultaneously cut to form the electrode plate having a predetermined shape.

5. The electrode plate for a secondary battery according to claim 4, wherein said thermoplastic paste material is selected from ethylene-vinyl acetate copolymer (EVA), ethylene-ethyl-acrylate (EEA), and ethylene methacrylic acid (EMAA).

6. The electrode plate for a secondary battery according to claim 4, wherein the insulating sheet is adhered to at least a front edge, a rear edge or both the front and rear edges of the active material layer of the electrode plate, wherein said electrode sheet and said insulating sheet are simultaneously cut in a longitudinal direction, and wherein a width of the electrode plate, a width of the active material layer on the electrode plate and a length of the insulating sheet are substantially the same.

7. A secondary battery having an electrode plate, said electrode plate comprising:
an electrode sheet with an active material layer on at least one surface thereof over a wider range than a predetermined width of an electrode plate and over a predetermined length; and an insulating sheet, adhering to a portion of said electrode sheet where a short-circuit may possibly occur, wherein said electrode sheet is wider in width than the active material layer, said portion being opposed to another electrode and said portion is at least one position selected from a front edge and a rear edge of the active material layer of the electrode plate, wherein said electrode sheet and said insulating sheet are simultaneously cut in a longitudinal direction to form the electrode plate having a predetermined shape of which a width of the electrode plate, a width of the active material layer on the electrode plate and a length of the insulating sheet are substantially the same.

8. A secondary battery, comprising:
an electrode sheet with an active material layer on at least one surface thereof over a wider range than a predetermined width of an electrode plate and over a predetermined length; and an insulating sheet adhered with a thermoplastic paste material that increases adhesion at a temperature of 60 to 120 degree Celsius, adhering to a portion of said electrode sheet where a short-circuit may possibly occur, wherein said electrode sheet is wider in width than the active material layer, such portion being opposed to another electrode, wherein said electrode sheet and said insulating sheet are simultaneously cut to form the electrode plate having a predetermined shape.

9. The secondary battery according to claim 8, wherein said thermoplastic paste material is selected from ethylene-vinyl acetate copolymer (EVA), ethylene-ethyl-acrylate (EEA), and ethylene methacrylic acid (EMAA).

10. The secondary battery according to claim 8,
wherein the insulating sheet is adhered to a front edge, a rear edge or both the front and rear edges of the active material layer of the electrode plate, wherein said electrode sheet and said insulating sheet are simultaneously cut in a longitudinal direction, and wherein a width of the electrode plate, a width of the active material layer on the electrode plate and a length of the insulating sheet are substantially the same.

11. A secondary battery having an electrode plate, said electrode plate being manufactured by a method comprising the steps of:
intermittently coating at least one surface of an electrode sheet with an active material at predetermined intervals over a wider range than a predetermined width of an electrode plate and over a predetermined length;

die-cutting an insulating sheet with a paste material on one side thereof into insulating sheets, each of which has a width wider than a predetermined width of an electrode plate;

causing said insulating sheet to adhere to a portion of said electrode sheet where a short-circuit may possibly occur, wherein said electrode sheet is wider in width than the active material layer, such part being opposed to another electrode plate, and said portion is at least one position selected from a front edge and a rear edge of the active material layer of the electrode plate; and simultaneously cutting said electrode sheet and said insulating sheet to form an electrode plate having a predetermined shape, wherein a width of the electrode plate, a width of the active material layer on the electrode plate and a length of the insulating sheet are substantially the same.

12. A secondary battery having an electrode plate, said electrode plate prepared by the process of:

intermittently coating at least one surface of an electrode sheet with an active material at predetermined intervals over a wider range than a predetermined width of an electrode plate and over a predetermined length;

die-cutting an insulating sheet with a paste material adhering on one side thereof into insulating sheets, each of which has a width wider than a predetermined width of an electrode plate;

adhering said insulating sheet to a portion of said electrode sheet where a short-circuit may possibly occur, wherein said electrode sheet is wider in width than the active material layer, said portion being opposed to another electrode plate, and said portion is at least one position selected from a front edge and a rear edge of the active material layer of the electrode plate; and simultaneously cutting said electrode sheet and said insulating sheet to form an electrode plate having a predetermined shape, wherein said paste material is a thermoplastic, and said insulating sheet is made to adhere to said electrode sheet through heat adhesion of said paste.

13. A secondary battery according to claim 12, wherein said thermoplastic paste material is selected from ethylene-vinyl acetate copolymer (EVA), ethylene-ethyl-acrylate (EEA), and ethylene methacrylic acid (EMAA).

14. The secondary battery according to claim 12, wherein the insulating sheet is adhered to a front edge, a rear edge or both the front and rear edges of the active material layer of the electrode plate, wherein said electrode sheet and said insulating sheet are simultaneously cut in a longitudinal direction, and wherein a width of the electrode plate, a width of the active material layer on the electrode plate and a length of the insulating sheet are substantially the same.

* * * * *